United States Patent [19]
Kegley

[11] Patent Number: 5,501,441
[45] Date of Patent: Mar. 26, 1996

[54] CUTTING BOARD IMPROVEMENT

[76] Inventor: Bill A. Kegley, P.O. Box 6636, Lynnwood, Wash. 98036

[21] Appl. No.: 339,073

[22] Filed: Nov. 14, 1994

[51] Int. Cl.⁶ .................................................. B23Q 3/00
[52] U.S. Cl. ................... 269/289 R; 269/302.1; 269/13
[58] Field of Search .................... 224/151, 906; 294/152, 156, 138; 269/289 R, 302.1, 13

[56] References Cited

U.S. PATENT DOCUMENTS

| | | | |
|---|---|---|---|
| 1,373,136 | 3/1921 | Kranz | 294/138 |
| 1,627,583 | 5/1927 | Thum | 294/152 |
| 2,609,024 | 9/1952 | Russ | 269/289 |
| 2,723,067 | 11/1955 | Fretz | 294/152 |
| 4,010,662 | 3/1977 | Perrault | 294/152 |

FOREIGN PATENT DOCUMENTS

2248177  1/1992  United Kingdom ............... 269/289 R

OTHER PUBLICATIONS

Counter–Maid ™, "The Reusable Flexible Kitchen Board," Dec. 1982.

*Primary Examiner*—Robert C. Watson
*Attorney, Agent, or Firm*—Christensen, O'Connor, Johnson & Kindness

[57] ABSTRACT

A chopping—cutting board constructed of flexible plastic sheeting which can be folded along a diagonal direction and held in tis position with one hand. Making transfer of materials from a large cutting surface to a smaller receptacle easy.

6 Claims, 1 Drawing Sheet

CUTTING BOARD IMPROVEMENT

BACKGROUND OF THE INVENTION

1. Field of the invention

This invention relates in general to kitchen chopping or cutting boards and in particular to cutting boards that incorporate a funneling or chute effect.

2. Prior art

A common difficulty associated with cutting boards has been transferring the chopped food from a large flat surface to a smaller receptacle without spilling. Past improvements aimed at overcoming this problem are:

U.S. Pat. No. 2,935,107 Bertelsen et al 5/1960. A folding board which is normally spring biased into a flat position for cutting then folded along the center to form a chute effect. Although this configuration allows for a large flat cutting surface. Disadvantages include.
  a. Requires two handed operation to fold and hold the board in a chute position.
  b. The sharp angle formed by the two sides when folded will tend to pinch and hold the chopped material making transfer to a smaller receptacle difficult.
  c. It is most desirable in the the design of a food preparation board to have a minimum of seams or crevices where food may become trapped and bacteria form. The design of Bertelsen does not meet this requirement.

U.S. Pat. No. 4,447,051 Price 5/1984. A flat triangular shaped one piece board with a projecting handle and vertical flanges attached to the sides which form a chute effect. While having the advantage of one hand operation disadvantages of this design include:
  a. A smaller cutting area due to its triangular shape.
  b. The vertical flanges extending upward from the cutting surface will interfere with the cutting process
  c. Again as in the Bertelsen design sharp angles and multiple joined components make cleaning difficult and the growth of bacteria a possibility.

U.S. Pat. No. 5,203,548 Sanders 4/1993. A one piece flexible cutting board with a projecting handle which can be folded into a chute. Disadvantages of this design are.
  a. the cutting surface is small in relation to my invention.
  b. only one side of the Sanders design is usable as a cutting surface.

My cutting board improvement will have none of the disadvantages of the prior art while incorporating all of the desirable qualities into a novel one piece flexible cutting board. Advantages of my invention include.
  a. A large unobstructed cutting area.
  b. One piece construction with no seams or joints where bacteria can form.
  c. Can be formed into a chute or funnel effect for easy transfer of food to a smaller container.
  d. Only one hand required to operate.
  e. Large capacity when folded.
  f. Very economical to manufacture.

SUMMARY OF THE INVENTION

The object of the present invention is to provide a cutting or chopping board with a large unobstructed working area and no protruding handles. A further object will be a one piece seamless cutting board which can be formed into a chute or funnel for easy transfer of chopped material. Still a further object will be to allow one hand operation of said cutting board to allow easy transfer of large quantities of chopped food to a smaller receptacle.

DETAILED DESCRIPTION

Figure 1:
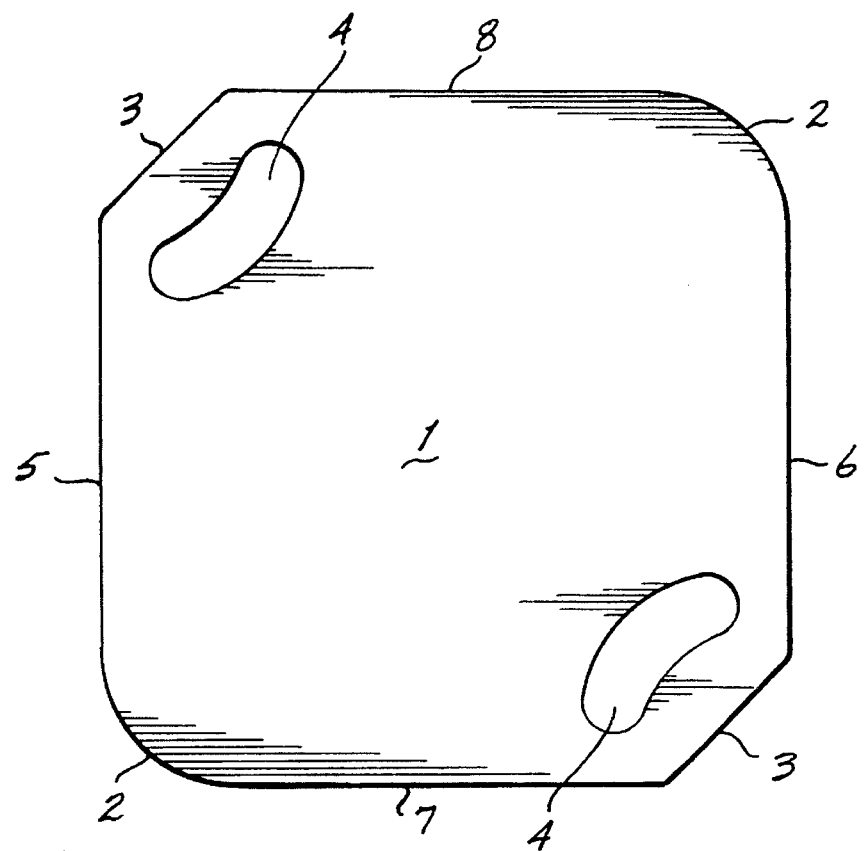
FIG. 1 Top view of the present Invention.

Refer now to FIG. 1 which is atop view of the present invention in the preferred embodiment. The board 1 will be made of flexible sheeting such as H.D.P.E. a plastic commonly used the manufacture of cutting boards. A thickness of one sixteenth inch will provide both flexibility and strength however this thickness may vary with different materials. FIG. 1 shows a cutting board that is square in shape and approximately sixteen Inches along a side. Two diagonally opposing corners of the cutting board are rounded. In FIG. 1 the rounded corners 2 are ninety degrees In arc with a radius of aproxamatly three inches. The remaining two diagonally opposed corners shall be cut to form an edge 3 aproxamatly three and one half inches long and parallel to that diagonal of the board which runs through the rounded corners 2. Two hand holes 4 aproxamatly one and half inches wide and four inches long are cut into the board aproxamatly one inch inward from and parallel to the diagonally opposed corners 3 so that the longer dimension of the hand hole lies parallel to edge 3.

Figure 2:
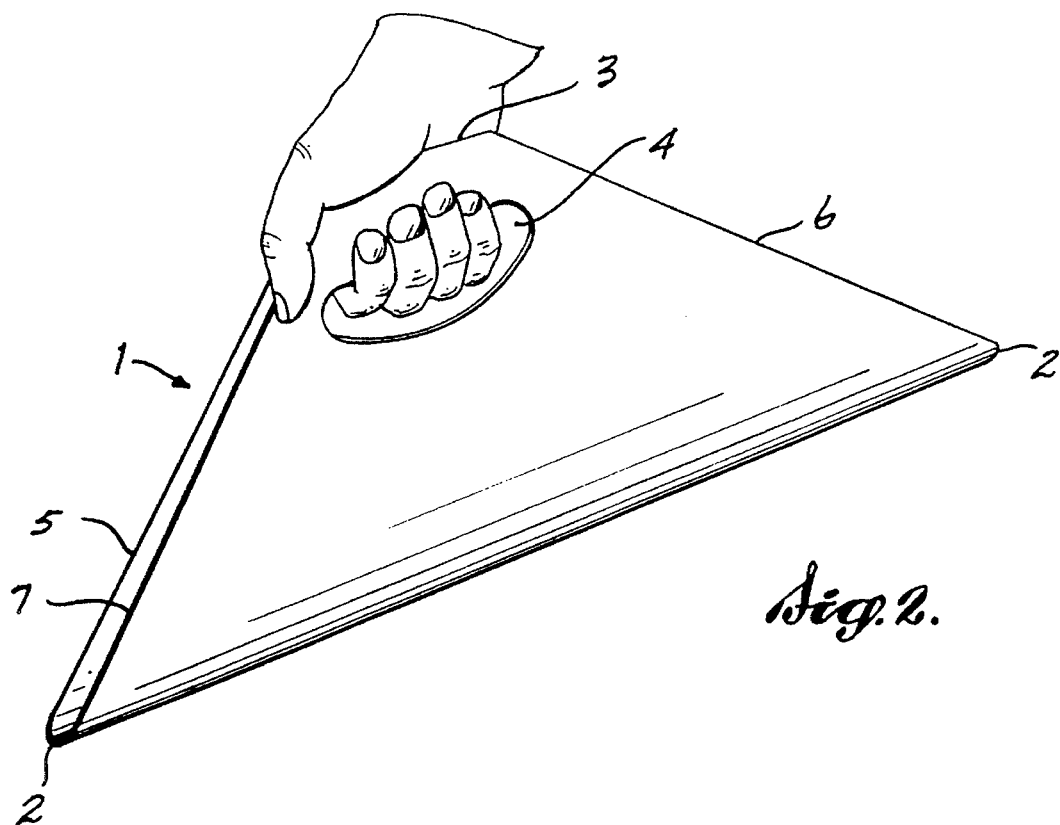
FIG. 2 Illustrates the present invention in use.

In use the board is placed on a flat surface such as a countertop. Material cropped on the board can then be transferred to a smaller receptacle by folding the board along the diagonal and placing one hand through the hand holes thereby forming a chute or funnel effect as seen in FIG. 2.

I claim

1. A cutting board comprising a substantially square, flat, flexible sheet having a first pair of diagonally opposite corners, a second pair of diagonally opposite corners, opposite side edges extending between corners of the first and second pairs, opposite end edges extending between corners of the first and second pairs, and four corner portions adjacent, respectively, to the corners of the first and second pairs of diagonally opposite corners, the sheet having a hand hole in the corner portion adjacent to each of the corners of the second pair of diagonally opposite corners, and the sheet being foldable along a diagonal intersecting the corners of the first pair of diagonally opposite corners to place the hand holes in registration and form a chute with adjacent end and side edges of the sheet inclined from the first pair of diagonally opposite corners to the second pair of diagonally opposite corners.

2. The cutting board defined in claim 1, in which each hand hole is elongated in a direction generally parallel to the diagonal intersecting the corners of the first pair.

3. The cutting board defined in claim 2, in which the corners of the second pair of diagonally opposite corners are straight edges interconnecting the adjacent side and end edges of the sheet.

4. The cutting board defined in claim 1, in which each hand hole defines an arc having its concave side facing the adjacent corner of the second pair.

5. The cutting board defined in claim 1, in which the corners of the second pair of diagonally opposite corners are straight edges and the corners of the first pair of diagonally opposite corners are arcuate.

6. A cutting board comprising a substantially square sheet of flexible material having; a first pair of diagonally opposite corners, each corner of the first pair being arcuate; a second pair of diagonally opposite corners, each corner of the second pair being straight; long and straight opposite side edges and long and straight opposite end edges, each of the side and end edges extending between a corner of the first pair and a corner of the second pair; the sheet having two elongated hand holes each located adjacent to one of the corners of the second pair and each defining an arc having a concave side facing the adjacent corner; the sheet being foldable along a diagonal intersecting the corners of the first pair of diagonally opposite corners to form a chute.

* * * * *

UNITED STATES PATENT AND TRADEMARK OFFICE
CERTIFICATE OF CORRECTION

PATENT NO. : 5,501,441

DATED : March 26, 1996

INVENTOR(S) : BILL A. Kegley

It is certified that error appears in the above-identified patent and that said Letters Patent is hereby corrected as shown below:

On the title page in item [56] References Cited the following should be inserted: U.S. PATENT DOCUMENTS

| | | |
|---|---|---|
| 120,394 | 10/1871 | Patterso+n |
| 1,497,228 | 06/1924 | Purdy |
| 2,935,107 | 05/1960 | Bertelsen et al. |
| 4,017,063 | 04/1977 | Brusich |
| 5,203,548 | 04/1993 | Sanders |

FOREIGN PATENT DOCUMENTS

| | | |
|---|---|---|
| GB2130080A | 05/1984 | United Kingdom |
| GB2052246A | 01/1981 | United Kingdom |
| 803.324 | 09/1936 | France |
| 882231 | 03/1988 | South Africa |

OTHER INFORMATION

Chop Chop, The "Flexible" Cutting Board, New Age Products, Inc., San Marcos, California Item [57] Abstract, line 3, "tis" should read --this--.
"hand. Making" should read --hand, making--.

UNITED STATES PATENT AND TRADEMARK OFFICE
CERTIFICATE OF CORRECTION

PATENT NO. : 5,501,441

DATED : March 26, 1996

INVENTOR(S) : B. A. Kegley

It is certified that error appears in the above-identified patent and that said Letters Patent is hereby corrected as shown below:

Columns 1 thru 4, should be deleted and replaced with attached Columns 1 thru 4

Signed and Sealed this

Twenty-second Day of October, 1996

Attest:

BRUCE LEHMAN

*Attesting Officer*    Commissioner of Patents and Trademarks

CUTTING BOARD IMPROVEMENT

FIELD OF THE INVENTION

This invention relates in general to kitchen chopping or cutting boards and in particular to cutting boards that incorporate a funneling or chute effect.

BACKGROUND OF THE INVENTION

A common difficulty associated with cutting boards has been transferring the chopped food from a large flat surface to a smaller receptacle without spilling. Past improvements aimed at overcoming this problem are:

2,935,107 Bertelsen et al. 5/1960—A folding board which is normally spring biased into a flat position for cutting then folded along the center to form a chute effect. Although this configuration allows for a large flat cutting surface, disadvantages include:

a. requires two-handed operation to fold and hold the board in a chute position;

b. the sharp angle formed by the two sides when folded will tend to pinch and hold the chopped material making transfer to a smaller receptacle difficult;

c. it is most desirable in the design of a food preparation board to have a minimum of seams or crevices where food may become trapped and bacteria can form, the design of Bertelsen does not meet this requirement.

4,447,051 Price 5/1984—A flat triangular-shaped one piece board with a projecting handle and vertical flanges attached to the sides which form a chute effect. While having the advantage of one hand operation, disadvantages of this design include:

a. a smaller cutting area due to its triangular shape;

b. the vertical flanges extending upward from the cutting surface will interfere with the cutting process;

c. again, as in the Bertelsen design, sharp angles and multiple joined components make cleaning difficult and the growth of bacteria a possibility.

5,203,548 Sanders 4/1993—A one piece flexible cutting board with a projecting handle which can be folded into a chute. Disadvantages of this design are:

a. the cutting surface is small;

b. only one side of the Sanders design is usable as a cutting surface.

My cutting board improvement will have none of the disadvantages of the prior art while incorporating all of the desirable qualities into a novel one piece flexible cutting board. Advantages of my invention include:

a. a large unobstructed cutting area;

b. one piece construction with no seams or joints where bacteria can form;

c. can be formed into a chute or funnel effect for easy transfer of food to a smaller container;

d. only one hand required to operate;

e. large capacity when folded;

f. very economical to manufacture.

SUMMARY OF THE INVENTION

The object of the present invention is to provide a cutting or chopping board with a large unobstructed working area and no protruding handles. A further object is to provide a one piece seamless cutting board which can be formed into a chute or funnel for easy transfer of chopped material. Still a further object is to allow one hand operation of said cutting board to allow easy transfer of large quantities of chopped food to a smaller receptacle.

BRIEF DESCRIPTION OF THE DRAWINGS

FIG. 1 is a top plan of the cutting board improvement of the present invention; and FIG. 2 is a top perspective illustrating the present invention in use.

DETAILED DESCRIPTION

Refer now to FIG. 1, which is a top view of the present invention in the preferred embodiment. The board 1 will be made of flexible sheeting such as H.D.P.E., a plastic commonly used in the manufacture of cutting boards. A thickness of one sixteenth of an inch will provide both flexibility and strength, however this thickness may vary with different materials. FIG. 1 shows a cutting board that is square in shape and approximately sixteen inches along a side. Two diagonally opposing corners (defining a first pair) of the cutting board are rounded or arcuate. In FIG. 1, the rounded corners 2 are ninety degrees in arc with a radius of approximately three inches. Each of the remaining two diagonally opposed corners (defining a second pair) shall be cut to form a straight corner edge 3 approximately three and one half inches long and parallel to that diagonal of the board which runs through the rounded corners 2. As shown in the drawings, the board 1 has long and straight opposite side edges 5 and 6, and long and straight opposite end edges 7 and 8, each extending from a rounded corner 2 to a straight corner 3. Two elongated hand holes 4 approximately one and one half inches wide and four inches long are cut, into the board approximately one inch inward from and parallel to the diagonally opposed corners 3 so that the longer dimension of the hand hole lies parallel to edge 3. Each hand hole defines an arc having its concave side facing the adjacent corner edge 3.

In use the board is placed on a flat surface such as a countertop. Material chopped on the board can then be transferred to a smaller receptacle by folding the board along the diagonal intersecting the rounded corners 2 and placing one hand through the registered hand holes. In this position the board forms a chute or funnel, as seen in FIG. 2, with adjacent end and side edges 5, 7 and 6, 8 being inclined from the rounded corners 2 to the corners 3.

While the preferred embodiment of the invention has been illustrated and described, it will be appreciated that various changes can be made therein without departing from the spirit and scope of the invention.

I claim:

1. A cutting board comprising a substantially square, flat, flexible sheet having a first pair of diagonally opposite corners, a second pair of diagonally opposite corners, opposite side edges extending between corners of the first and second pairs, opposite end edges extending between corners of the first and second pairs, and four corner portions adjacent, respectively, to the corners of the first and second pairs of diagonally opposite corners, the sheet having a hand hole in the corner portion adjacent to each of the corners of the second pair of diagonally opposite corners, and the sheet being foldable along a diagonal intersecting the corners of the first pair of diagonally opposite corners to place the hand holes in registration and form a chute with adjacent end and side edges of the sheet inclined from the first pair of diagonally opposite corners to the second pair of diagonally opposite corners.

2. The cutting board defined in claim 1, in which each hand hole is elongated in a direction generally parallel to the diagonal intersecting the corners of the first pair.

3. The cutting board defined in claim 2, in which the corners of the second pair of diagonally opposite corners are straight edges interconnecting the adjacent side and end edges of the sheet.

4. The cutting board defined in claim 1, in which each hand hole defines an arc having its concave side facing the adjacent corner of the second pair.

5. The cutting board defined in claim 1, in which the corners of the second pair of diagonally opposite corners are straight edges and the corners of the first pair of diagonally opposite corners are arcuate.

6. A cutting board comprising a substantially square sheet of flexible material having; a first pair of diagonally opposite corners, each corner of the first pair being arcuate; a second pair of diagonally opposite corners, each corner of the second pair being straight; long and straight opposite side edges and long and straight opposite end edges, each of the side and end edges extending between a corner of the first pair and a corner of the second pair; the sheet having two elongated hand holes each located adjacent to one of the corners of the second pair and each defining an arc having a concave side facing the adjacent corner; the sheet being foldable along a diagonal intersecting the corners of the first pair of diagonally opposite corners to form a chute.

* * * * *